US005812179A

United States Patent [19]

Pensavecchia et al.

[11] Patent Number: 5,812,179

[45] Date of Patent: Sep. 22, 1998

[54] APPARATUS FOR LASER-DISCHARGE IMAGING INCLUDING BEAM-GUIDING ASSEMBLIES

[75] Inventors: Frank G. Pensavecchia; John G. Sousa, both of Hudson; John F. Kline, Londonderry; Richard A. Williams, Hampstead, all of N.H.

[73] Assignee: Presstek, Inc., Hudson, N.H.

[21] Appl. No.: 525,872

[22] Filed: Sep. 8, 1995

[51] Int. Cl.$^6$ .................................................... G03B 21/00

[52] U.S. Cl. .......................... 347/256; 347/211; 359/811

[58] Field of Search .................................... 347/262, 252, 347/257, 256, 258, 259, 241, 242, 243, 263; 359/811, 838; 295/91

[56] References Cited

U.S. PATENT DOCUMENTS

| | | | |
|---|---|---|---|
| 3,284,722 | 11/1966 | Gray . | |
| 4,185,891 | 1/1980 | Kaestner . | |
| 4,440,470 | 4/1984 | Khoe . | |
| 4,553,148 | 11/1985 | Behrens et al. | 346/107 |
| 4,812,005 | 3/1989 | Heywang . | |
| 4,890,289 | 12/1989 | Basu et al. . | |
| 4,945,544 | 7/1990 | Tanaka et al. . | |
| 5,080,706 | 1/1992 | Snyder et al. . | |
| 5,081,639 | 1/1992 | Snyder et al. . | |
| 5,155,631 | 10/1992 | Snyder et al. . | |
| 5,351,617 | 10/1994 | Williams et al. . | |
| 5,479,201 | 12/1995 | Sugiura et al. | 347/257 |
| 5,539,444 | 7/1996 | Ikeda et al. | 347/241 |
| 5,546,216 | 8/1996 | Suzuki | 359/216 |
| 5,555,122 | 9/1996 | Takada | 359/196 |

*Primary Examiner*—Peter S. Wong
*Assistant Examiner*—Gregory J. Toatley, Jr.
*Attorney, Agent, or Firm*—Cesari and McKenna, LLP

[57] ABSTRACT

Laser guiding and focusing apparatus for imaging lithographic printing members responsive to the output of laser devices. Radiation passes through at least one discrete layer of a printing member and ablates one or more underlying layers, resulting in an imagewise pattern of features on the printing member. The radiation is obtained from a laser diode and its dispersion reduced to produce an image spot with maximum depth-of-focus tolerance.

19 Claims, 8 Drawing Sheets

APPARATUS FOR LASER-DISCHARGE IMAGING INCLUDING BEAM-GUIDING ASSEMBLIES

BACKGROUND OF THE INVENTION

1. Field of the Invention

The present invention relates to digital printing apparatus and methods, and more particularly to a system for imaging lithographic printing members on- or off-press using digitally controlled laser output.

2. Description of the Related Art

Traditional techniques of introducing a printed image onto a recording material include letterpress printing, gravure printing and offset lithography. All of these printing methods require a plate, usually loaded onto a plate cylinder of a rotary press for efficiency, to transfer ink in the pattern of the image. In letterpress printing, the image pattern is represented on the plate in the form of raised areas that accept ink and transfer it onto the recording medium by impression. Gravure printing cylinders, in contrast, contain series of wells or indentations that accept ink for deposit onto the recording medium; excess ink must be removed from the cylinder by a doctor blade or similar device prior to contact between the cylinder and the recording medium.

In the case of offset lithography, the image is present on a plate or mat as a pattern of ink-accepting (oleophilic) and ink-repellent (oleophobic) surface areas. In a dry printing system, the plate is simply inked and the image transferred onto a recording material; the plate first makes contact with a compliant intermediate surface called a blanket cylinder which, in turn, applies the image to the paper or other recording medium. In typical sheet-fed press systems, the recording medium is pinned to an impression cylinder, which brings it into contact with the blanket cylinder.

In a wet lithographic system, the non-image areas are hydrophilic, and the necessary ink-repellency is provided by an initial application of a dampening (or "fountain") solution to the plate prior to inking. The ink-abhesive fountain solution prevents ink from adhering to the non-image areas, but does not affect the oleophilic character of the image areas.

If a press is to print in more than one color, a separate printing plate corresponding to each color is required, each such plate usually being made photographically as described below. In addition to preparing the appropriate plates for the different colors, the operator must mount the plates properly on the plate cylinders of the press, and coordinate the positions of the cylinders so that the color components printed by the different cylinders will be in register on the printed copies. Each set of cylinders associated with a particular color on a press is usually referred to as a printing station.

In most conventional presses, the printing stations are arranged in a straight or "in-line" configuration. Each such station typically includes an impression cylinder, a blanket cylinder, a plate cylinder and the necessary ink (and, in wet systems, dampening) assemblies. The recording material is transferred among the print stations sequentially, each station applying a different ink color to the material to produce a composite multi-color image. Another configuration, described in U.S. Pat. No. 4,936,211 (co-owned with the present application and hereby incorporated by reference), relies on a central impression cylinder that carries a sheet of recording material past each print station, eliminating the need for mechanical transfer of the medium to each print station.

With either type of press, the recording medium can be supplied to the print stations in the form of cut sheets or a continuous "web" of material. The number of print stations on a press depends on the type of document to be printed. For mass copying of text or simple monochrome line-art, a single print station may suffice. To achieve full tonal rendition of more complex monochrome images, it is customary to employ a "duotone" approach, in which two stations apply different densities of the same color or shade. Full-color presses apply ink according to a selected color model, the most common being based on cyan, magenta, yellow and black (the "CMYK" model). Accordingly, the CMYK model requires a minimum of four print stations; more may be required if a particular color is to be emphasized. The press may contain another station to apply spot lacquer to various portions of the printed document, and may also feature one or more "perfecting" assemblies that invert the recording medium to obtain two-sided printing.

The plates for an offset press are usually produced photographically. To prepare a wet plate using a typical negative-working subtractive process, the original document is photographed to produce a photographic negative. This negative is placed on an aluminum plate having a water-receptive oxide surface coated with a photopolymer. Upon exposure to light or other radiation through the negative, the areas of the coating that received radiation (corresponding to the dark or printed areas of the original) cure to a durable oleophilic state. The plate is then subjected to a developing process that removes the uncured areas of the coating (i.e., those which did not receive radiation, corresponding to the non-image or background areas of the original), exposing the hydrophilic surface of the aluminum plate.

A similar photographic process is used to create dry plates, which typically include an ink-abhesive (e.g., silicone) surface layer coated onto a photosensitive layer, which is itself coated onto a substrate of suitable stability (e.g., an aluminum sheet). Upon exposure to actinic radiation, the photosensitive layer cures to a state that destroys its bonding to the surface layer. After exposure, a treatment is applied to deactivate the photoresponse of the photosensitive layer in unexposed areas and to further improve anchorage of the surface layer to these areas. Immersion of the exposed plate in developer results in dissolution and removal of the surface layer at those portions of the plate surface that have received radiation, thereby exposing the ink-receptive, cured photosensitive layer.

Photographic platemaking processes tend to be time-consuming and require facilities and equipment adequate to support the necessary chemistry. To circumvent these shortcomings, practitioners have developed a number of electronic alternatives to plate imaging, some of which can be utilized on-press. With these systems, digitally controlled devices alter the ink-receptivity of blank plates in a pattern representative of the image to be printed. Such imaging devices include sources of electromagnetic-radiation pulses, produced by one or more laser or non-laser sources, that create chemical changes on plate blanks (thereby eliminating the need for a photographic negative); ink-jet equipment that directly deposits ink-repellent or ink-accepting spots on plate blanks; and spark-discharge equipment, in which an electrode in contact with or spaced close to a plate blank produces electrical sparks to physically alter the topology of the plate blank, thereby producing "dots" which collectively form a desired image (see, e.g., U.S. Pat. No. 4,911,075, co-owned with the present application and hereby incorporated by reference).

Because of the ready availability of laser equipment and their amenability to digital control, significant effort has been devoted to the development of laser-based imaging systems. Early examples utilized lasers to etch away material from a plate blank to form an intaglio or letterpress pattern. See, e.g., U.S. Pat. Nos. 3,506,779; 4,347,785. This approach was later extended to production of lithographic plates, e.g., by removal of a hydrophilic surface to reveal an oleophilic underlayer. See, e.g., U.S. Pat. No. 4,054,094. These systems generally require high-power lasers, which are expensive and slow.

U.S. Pat. Nos. 5,351,617 and 5,385,092 disclose an ablative recording system that uses low-power laser discharges to remove, in an imagewise pattern, one or more layers of a lithographic printing blank, thereby creating a ready-to-ink printing member without the need for photographic development. In accordance with those systems, laser output is guided from the diode to the printing surface and focused onto that surface (or, desirably, onto the layer most susceptible to laser ablation, which will generally lie beneath the surface layer).

As discussed in the '617 and '092 patents, laser output can be generated remotely and brought to the printing blank by means of optical fibers and focusing lens assemblies. Alternatively, the laser diode itself can be positioned adjacent the printing member and its output provided directly thereto through a focusing assembly. While commercially suitable, these arrangements can be vulnerable to power loss. Laser diodes are constructed to emit radiation from an output slit, and the radiation disperses around the edges of the slit as it exits. This means that, in the case of fiber-optic systems, power can be lost where laser output is coupled into the fiber, along the fiber if it is bent beyond the critical angle of refraction, and at the output of the fiber, where emitted radiation can once again disperse. Even in direct-output systems, which avoid the use of optical fibers, loss of power can occur unless steps are taken to reduce the divergence of radiation exiting the diode.

DESCRIPTION OF THE INVENTION

Brief Summary of the Invention

The present invention utilizes at least one laser device that emits in the IR, and preferably near-IR region, to image ablative printing members as disclosed, for example, in the '617 and '092 patents, as well as in U.S. Pat. Nos. 5,339,737 and 5,379,698. An important feature of the invention is the use of solid-state lasers (commonly termed semiconductor lasers and typically based on gallium aluminum arsenide or gallium aluminum indium compounds) as sources; these are distinctly economical and convenient, and may be used in conjunction with a variety of imaging devices. The use of near-IR radiation facilitates use of a wide range of organic and inorganic absorption compounds and, in particular, semiconductive and conductive types.

In accordance with the invention, laser output is provided directly to a blank printing member via an arrangement that guides the emitted radiation, reduces its divergence and focuses it onto the plate surface. (In fact, the beam is preferably focused on the "ablation layer" designed to volatilize in response to laser radiation; however, the depth of focus of the laser beam provides a degree of tolerable deviation.) As used herein, the term "plate" or "member" refers to any type of printing member or surface capable of recording an image defined by regions exhibiting differential affinities for ink and/or fountain solution; suitable configurations include the traditional planar or curved lithographic plates that are mounted on the plate cylinder of a printing press, but can also include seamless cylinders (e.g., the roll surface of a plate cylinder), an endless belt, or other arrangement.

The beam-guiding arrangement can take the form of a parabolic mirror, in one embodiment, or a cylindrical microlens in a second embodiment. In both cases, the arrangement also provides for adjustment in order to place and maintain the beam output at a precise orientation with respect to the plate surface. Ordinarily the system will include (for reasons of speed) a plurality of lasers and an equal number of guiding and focusing arrangements, or a manifold arrangement that serves several or all lasers.

A controller causes relative movement between the lasers (which are organized in a writing array) and the printing surface, effectively scanning the lasers over the surface, and activates them at positions adjacent selected points or areas of the plate. The controller indexes the writing array, after completion of each pass across or along the printing member, a distance determined by the number of beams emanating from the array and by the desired resolution (i.e, the number of image points per unit length). The pattern of laser activation is determined by image signals, provided to the controller and corresponding to the original document or picture being copied onto the plate, to produce a precise negative or positive image of that original. The image signals are stored as a bitmap data file on a computer. Such files may be generated by a raster image processor (RIP) or other suitable means. For example, a RIP can accept input data in page-description language, which defines all of the features required to be transferred onto the printing plate, or as a combination of page-description language and one or more image data files. The bitmaps are constructed to define the hue of the color as well as screen frequencies and angles.

The imaging apparatus can operate on its own, functioning solely as a platemaker, or can be incorporated directly into a lithographic printing press. In the latter case, printing may commence immediately after application of the image to a blank plate, thereby reducing press set-up time considerably. The imaging apparatus can be configured as a flatbed recorder or as a drum recorder, with the lithographic plate blank mounted to the interior or exterior cylindrical surface of the drum. Obviously, the exterior drum design is more appropriate to use in situ, on a lithographic press, in which case the print cylinder itself constitutes the drum component of the recorder or plotter.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

1. Exterior-Drum Recording

Figure 1:
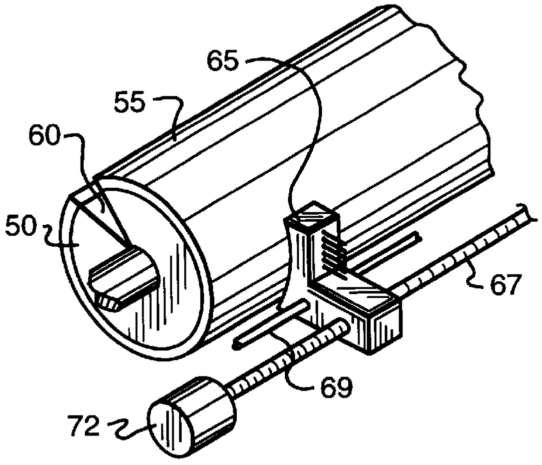
FIG. 1 is an isometric view of the cylindrical embodiment of an imaging apparatus in accordance with the present invention, and which operates in conjunction with a diagonal-array writing array.

Refer first to FIG. 1 of the drawings, which illustrates the exterior drum embodiment of our imaging system. The assembly includes a cylinder 50 around which is wrapped a lithographic plate blank 55. Cylinder 50 includes a void segment 60, within which the outside margins of plate 55 are secured by conventional clamping means (not shown). We note that the size of the void segment can vary greatly depending on the environment in which cylinder 50 is employed, and in some arrangements (e.g., using "seamless" printing members) is absent entirely.

If desired, cylinder 50 is straightforwardly incorporated into the design of a conventional lithographic press, and serves as the plate cylinder of the press. In a typical press construction, plate 55 receives ink from an ink train, whose terminal cylinder is in rolling engagement with cylinder 50. The latter cylinder also rotates in contact with a blanket cylinder, which transfers ink to the recording medium. The press may have more than one such printing assembly arranged in a linear array. Alternatively, a plurality of assemblies may be arranged about a large central impression cylinder in rolling engagement with all of the blanket cylinders.

The recording medium is mounted to the surface of the impression cylinder, and passes through the nip between that cylinder and each of the blanket cylinders. Suitable central-impression and in-line press configurations are described in U.S. Pat. No. 5,163,368 (commonly owned with the present application and hereby incorporated by reference) and the '075 patent.

Figure 2:
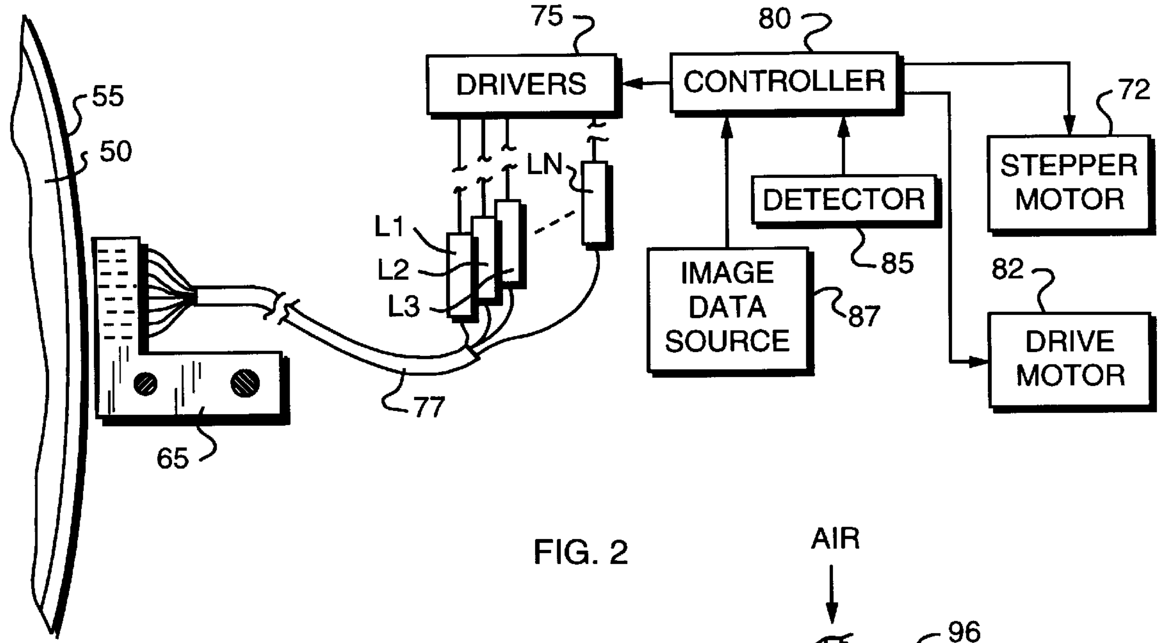
FIG. 2 is a schematic depiction of the embodiment shown in FIG. 1, and which illustrates in greater detail its mechanism of operation.

Cylinder 50 is supported in a frame and rotated by a standard electric motor or other conventional means (illustrated schematically in FIG. 2). The angular position of cylinder 50 is monitored by a shaft encoder (see FIG. 4). A writing array 65, mounted for movement on a lead screw 67 and a guide bar 69, traverses plate 55 as it rotates. Axial movement of writing array 65 results from rotation of a stepper motor 72, which turns lead screw 67 and thereby shifts the axial position of writing array 55. Stepper motor 72 is activated during the time writing array 65 is positioned over void 60, after writing array 65 has passed over the entire surface of plate 55. The rotation of stepper motor 72 shifts writing array 65 to the appropriate axial location to begin the next imaging pass.

The axial index distance between successive imaging passes is determined by the desired resolution. FIG. 2 provides a representative configuration which, although it does not embody the present invention, illustrates the manner in which the laser sources are controlled. As shown therein, a series of lasers $L_1, L_2, L_3 \ldots L_n$, driven by suitable laser drivers collectively designated by reference numeral 75 (and discussed in greater detail below), each provide output to a fiber-optic cable. The lasers are preferably gallium-arsenide models, although any high-speed lasers that emit in the near infrared region can be utilized advantageously.

The size of an image feature (i.e., a dot, spot or area) and image resolution can be varied in a number of ways. The laser pulse must be of sufficient power and duration to produce useful ablation for imaging; however, there exists an upper limit in power levels and exposure times above which further useful, increased ablation is not achieved. Unlike the lower threshold, this upper limit depends strongly on the type of plate to be imaged.

Variation within the range defined by the minimum and upper parameter values can be used to control and select the size of image features. In addition, so long as power levels and exposure times exceed the minimum, feature size can be changed simply by altering the focusing apparatus (as discussed below). The final resolution or print density obtainable with a given-sized feature can be enhanced by overlapping image features (e.g., by advancing the writing array an axial distance smaller than the diameter of an image feature). Image-feature overlap expands the number of gray scales achievable with a particular feature.

The final plates should be capable of delivering at least 1,000, and preferably at least 50,000 printing impressions. This requires fabrication from durable material, and imposes certain minimum power requirements on the laser sources. For a laser to be capable of imaging the plates described below, its power density should be at least 0.2 megawatt/in and preferably at least 0.6 megawatt/in$^2$. Significant ablation ordinarily does not occur below these power levels, even if the laser beam is applied for an extended time.

Because feature sizes are ordinarily quite small—on the order of 25 $\mu$m—the necessary power intensities are readily achieved even with lasers having moderate output levels (on the order of about 1 watt); a focusing apparatus, as discussed below, concentrates the entire laser output onto the small feature, resulting in high effective energy densities.

Also as shown in FIG. 2, a controller 80 actuates laser drivers 75 when the associated lasers reach appropriate points opposite plate 55, and in addition operates stepper motor 72 and the cylinder drive motor 82. Laser drivers 75 should be capable of operating at high speed to facilitate imaging at commercially practical rates. The drivers preferably include a pulse circuit capable of generating at least 40,000 laser-driving pulses/second, with each pulse being relatively short, i.e., on the order of 10–15 $\mu$sec (although pulses of both shorter and longer durations have been used with success). A suitable design is described below.

Controller 80 receives data from two sources. The angular position of cylinder 50 with respect to writing array 65 is constantly monitored by a detector 85 (described in greater detail below), which provides signals indicative of that position to controller 80. In addition, an image data source 87 (e.g., a computer) also provides data signals to controller 80. The image data define points on plate 55 where image spots are to be written. Controller 80, therefore, correlates the instantaneous relative positions of writing array 65 and plate 55 (as reported by detector 85) with the image data to actuate the appropriate laser drivers at the appropriate times during scan of plate 55. The control circuitry required to implement this scheme is well-known in the scanner and plotter art; a suitable design is described in U.S. Pat. No. 5,174,205, commonly owned with the present application and hereby incorporated by reference.

Figure 3:
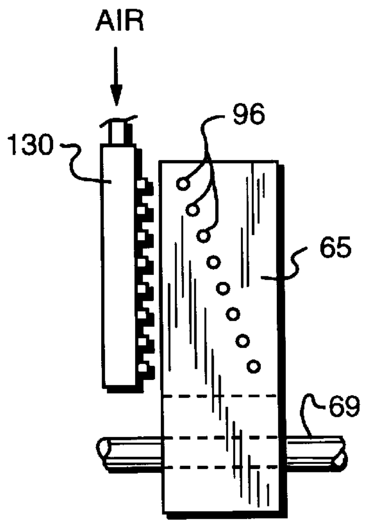
FIG. 3 is a front-end view of a writing array for imaging in accordance with the present invention, and in which imaging elements are arranged in a diagonal array.

In the representative configuration illustrated in FIG. 2, the laser output cables terminate in lens assemblies, mounted within writing array 65, that precisely focus the beams onto the surface of plate 55. A suitable lens-assembly design is described in the '617 and '092 patents; these assemblies are generically indicated by reference numeral 96. The manner in which the lens assemblies are distributed along writing array 65, as well as the design of the writing array, require careful design considerations. One suitable configuration is illustrated in FIG. 3. In this arrangement, lens assemblies 96 are staggered across the face of body 65. The design preferably includes an air manifold 130, connected to a source of pressurized air and containing a series of outlet ports aligned with each lens or laser. Introduction of air into the manifold and its discharge through the outlet ports cleans the lenses of debris during operation, and also purges fine-particle aerosols and mists from the region between lens assemblies 96 and plate surface 55.

The staggered lens design facilitates use of a greater number of lens assemblies in a single head than would be possible with a linear arrangement. And since imaging time depends directly on the number of lens elements, a staggered design offers the possibility of faster overall imaging. Another advantage of this configuration stems from the fact that the diameter of the beam emerging from each lens assembly is ordinarily much smaller than that of the focusing lens itself. Therefore, a linear array requires a relatively significant minimum distance between beams, and that distance may well exceed the desired printing density. This results in the need for a fine stepping pitch. By staggering the lens assemblies, we obtain tighter spacing between the laser beams and, assuming the spacing is equivalent to the desired print density, can therefore index across the entire axial width of the array. Controller 80 either receives image data already arranged into vertical columns, each corresponding to a different lens assembly, or can progressively sample, in columnar fashion, the contents of a memory buffer containing a complete bitmap representation of the image to be transferred. In either case, controller 80 recognizes the different relative positions of the lens assemblies with respect to plate 55 and actuates the appropriate laser only when its associated lens assembly is positioned over a point to be imaged.

Figure 4:
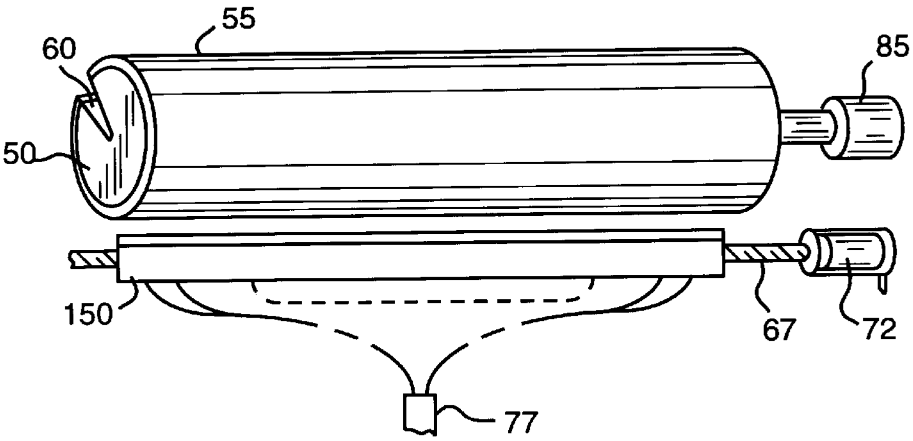
FIG. 4 is an isometric view of the cylindrical embodiment of an imaging apparatus in accordance with the present invention, and which operates in conjunction with a linear writing array.

An alternative array design is illustrated in FIG. 4, which also shows the encoder 85 mounted to the cylinder 50. Preferred detector designs are described in the '205 patent. In this case the writing array, designated by reference numeral 150, comprises a long linear body fed by fiber-optic cables drawn from bundle 77. The interior of writing array 150, or some portion thereof, contains threads that engage lead screw 67, rotation of which advances writing array 150 along plate 55 as discussed previously. Individual lens assemblies 96 are evenly spaced a distance B from one another. Distance B is chosen to support all desired imaging resolutions; specifically, it must be evenly divisible by each resolution so as to accommodate an integral number of axially consecutive image dots. Each time writing array 150 encounters void 60, stepper motor 72 rotates to advance writing array 150 an axial distance equal to the desired distance between imaging passes (i.e., the print resolution). This distance is smaller by a factor of n than the distance indexed by the previously described embodiment (writing array 65), where n is the number of lens assemblies included in writing array 65.

Writing array 150 includes an internal air manifold 155 and a series of outlet ports 160 aligned with lens assemblies 96. Once again, these function to remove debris from the lens assemblies and imaging region during operation.

2. Flatbed Recording

Figure 7:
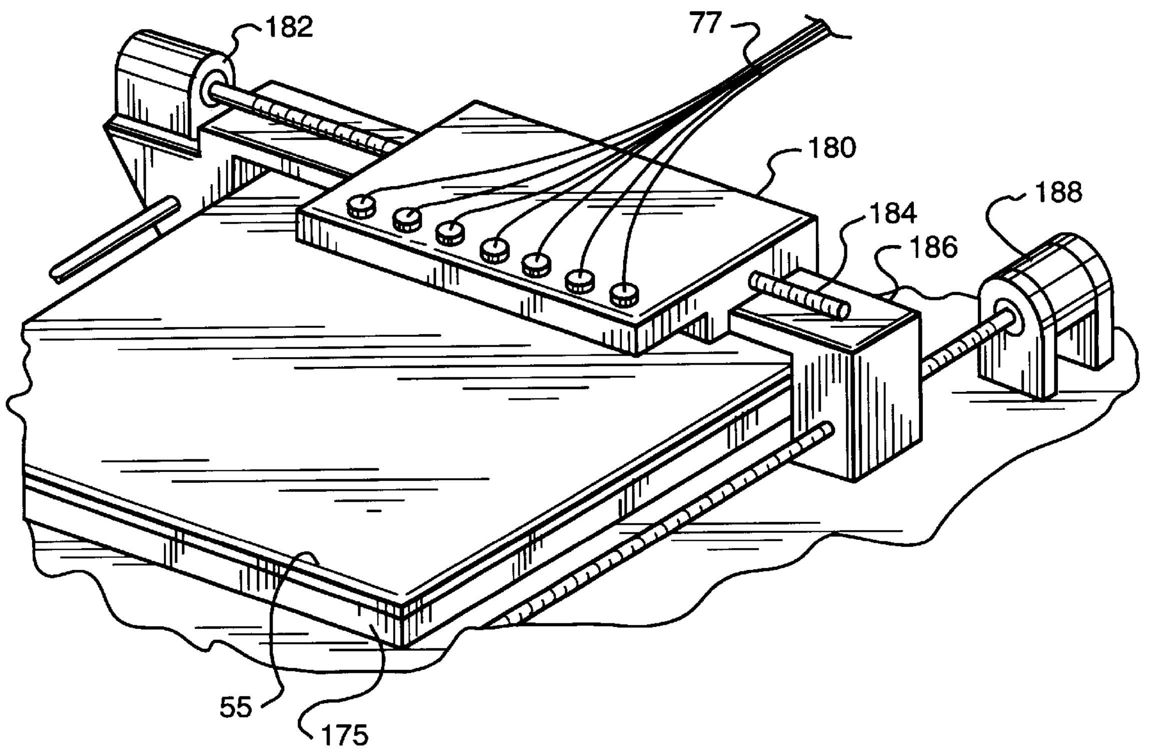
FIG. 7 is an isometric view of the flatbed embodiment of an imaging apparatus having a linear lens array.

The imaging apparatus can also take the form of a flatbed recorder, as depicted in FIG. 7. In the illustrated embodiment, the flatbed apparatus includes a stationary support 175, to which the outer margins of plate 55 are mounted by conventional clamps or the like. A writing array 180 receives fiber-optic cables from bundle 77, and includes a series of lens assemblies as described above. These are oriented toward plate 55.

A first stepper motor 182 advances writing array 180 across plate 55 by means of a lead screw 184, but now writing array 180 is stabilized by a bracket 186 instead of a guide bar. Bracket 180 is indexed along the opposite axis of support 175 by a second stepper motor 188 after each traverse of plate 55 by writing array 180 (along lead screw 184). The index distance is equal to the width of the image swath produced by imagewise activation of the lasers during the pass of writing array 180 across plate 55. After bracket 186 has been indexed, stepper motor 182 reverses direction and imaging proceeds back across plate 55 to produce a new image swath just ahead of the previous swath.

It should be noted that relative movement between writing array 180 and plate 155 does not require movement of writing array 180 in two directions. Instead, if desired, support 175 can be moved along either or both directions. It is also possible to move support 175 and writing array 180 simultaneously in one or both directions. Furthermore, although the illustrated writing array 180 includes a linear arrangement of lens assemblies, a staggered design is also feasible.

3. Interior-Arc Recording

Figure 8:
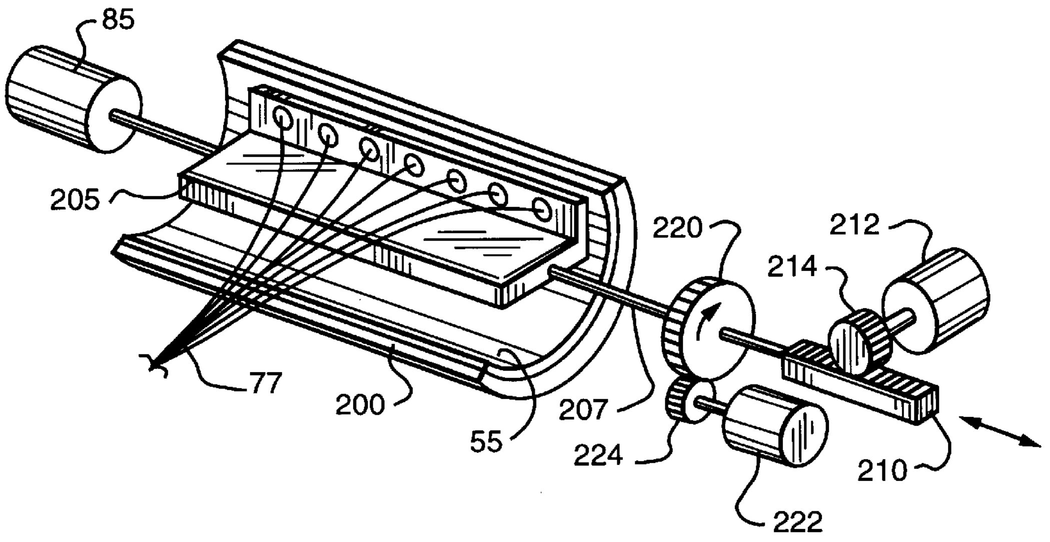
FIG. 8 is an isometric view of the interior-drum embodiment of an imaging apparatus having a linear lens array.

Instead of a flatbed, the plate blank can be supported on an arcuate surface as illustrated in FIG. 8. This configuration permits rotative, rather than linear movement of the writing array and/or the plate.

The interior-arc scanning assembly includes an arcuate plate support 200, to which a blank plate 55 is clamped or otherwise mounted. An L-shaped writing array 205 includes a bottom portion, which accepts a support bar 207, and a front portion containing channels to admit the lens assemblies. In the preferred embodiment, writing array 205 and support bar 207 remain fixed with respect to one another, and writing array 205 is advanced axially across plate 55 by linear movement of a rack 210 mounted to the end of support bar 207. Rack 210 is moved by rotation of a stepper motor 212, which is coupled to a gear 214 that engages the teeth of rack 210. After each axial traverse, writing array 205 is indexed circumferentially by rotation of a gear 220 through which support bar 207 passes and to which it is fixedly engaged. Rotation is imparted by a stepper motor 222, which engages the teeth of gear 220 by means of a second gear 224. Stepper motor 222 remains in fixed alignment with rack 210.

After writing array 205 has been indexed circumferentially, stepper motor 212 reverses direction and imaging proceeds back across plate 55 to produce a new image swath just ahead of the previous swath.

4. Output Guide and Lens Assembly

In accordance with the present invention, laser sources are disposed along the writing head rather than located remotely with respect thereto. Basically, the output of each laser source is directed toward a parabolic mirror or through a microlens that reduces the divergence of its output. The reflection from the mirror or the rays emerging from the microlens are directed toward the printing member to be imaged, passing through a suitable focusing arrangement.

Figure 9C:
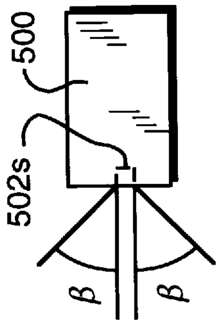
FIG. 9C is an elevation of the diode shown in FIG. 9A, showing the dispersion of radiation exiting therefrom along the other dimension.
Figure 9B:
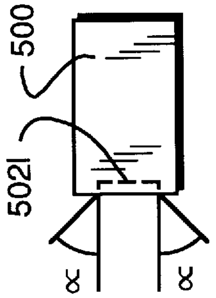
FIG. 9B is a plan view of the diode shown in FIG. 9A, showing the dispersion of radiation exiting therefrom along one dimension.
Figure 9A:
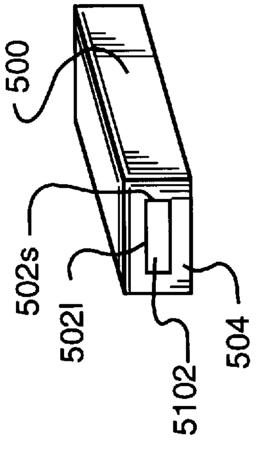
FIG. 9A is an isometric view of a simplified laser diode.

Refer to FIG. 9A, which illustrates, in simplified form, a common type of laser diode in which radiation is emitted through a slit 502 in the diode face 504. The dimensions of slit 502 are specified along two axes, a long axis 502*l* and a short axis 502*s*. Radiation disperses as it exits slit 502, diverging at the slit edges. This is shown in FIGS. 9B and 9C. The dispersion around the short edges (i.e., along long axis 502*l*), as depicted in FIG. 9B (where diode 500 is viewed in plan), is defined by an angle a; the dispersion around the long edges (i.e., along short axis 502*s*), as depicted in FIG. 9C (where diode 500 is viewed in elevation), is defined by an angle β. The numerical aperture (NA) of slit 502 along either axis is defined as the sine of the dispersion angle α or β.

For optimum performance, α=β and the unitary NA is less than 0.22, and preferably less than 0.060. Small NA values correspond to large depths-of-focus, and therefore provide working tolerances that facilitate convenient focus of the radiation onto the ablatable printing layer. Without correction, however, these desirable conditions are usually impossible, even with special mask structures that have recently been applied to the multi-stripe and single-stripe semiconductor lasers useful in the present invention; laser diode 500 typically does not radiate at a constant angle, with divergence around one edge exceeding that around the other edges.

Figure 10:
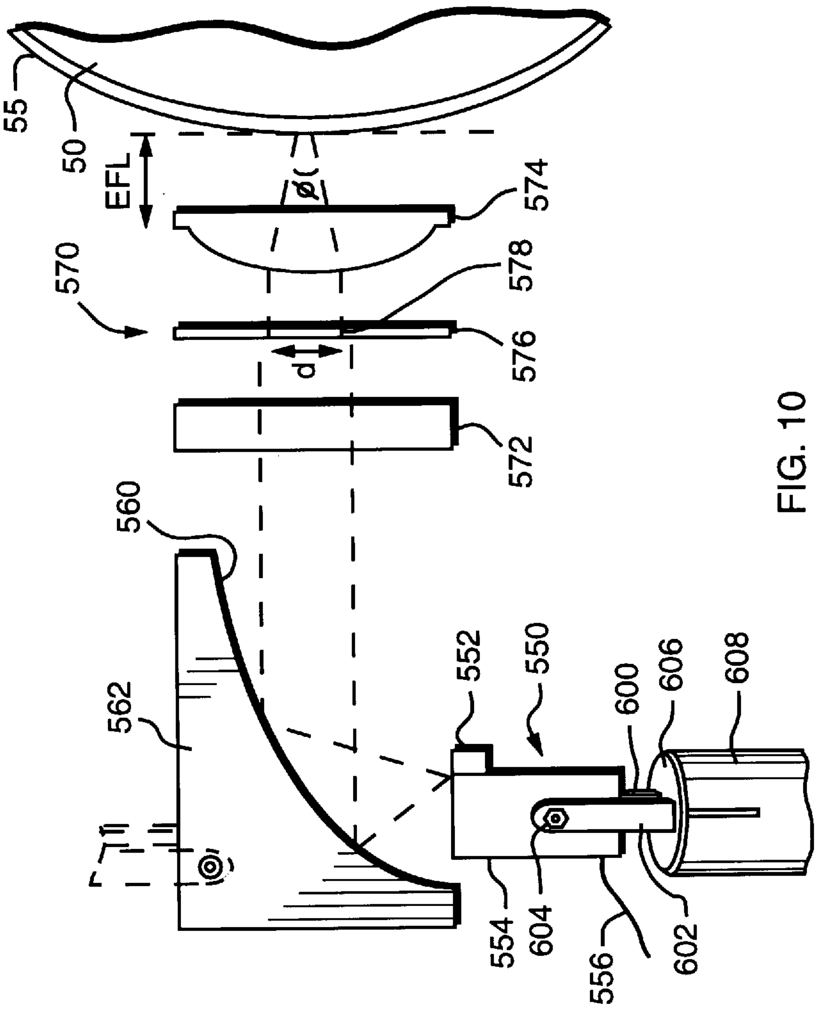
FIG. 10 is a elevational side view, partially in schematic form, of an apparatus for guiding and focusing laser output in accordance with the present invention.

Assuming that the NA along one axis falls within acceptable limits, the NA along the other axis can be reduced by reflecting the radiation from a parabolic mirror, as shown in FIG. 10. The depicted laser 550 includes a diode portion 552, which contains the emission slit, and a heat sink portion 554. Power is selectively supplied to the diode by a cable 556, which is connected to one of the drivers 75 (see FIG. 2). The emitted radiation strikes the surface 560 of a parabolic mirror 562, and rays diverging along the short axis 502*s* as they exit the slit (as shown in FIG. 10) are brought into substantial alignment due to the curvature of surface 560. The rays are directed toward plate blank 55 through a lens arrangement that focuses and, if necessary, further collimates the beam. Lens arrangement 570 preferably includes a collimating cylindrical lens 572 (which acts only on rays diverging along the long axis 502*l*) and a condensing or focusing lens 574. The focal length of lens 574 is chosen such that, at a normal working distance between mirror 562 and plate 55, the beam reflected from mirror surface 560 will be precisely focused on the ablation layer of plate 55 at a diameter optimal for imaging (typically about 25 μm). Lens 574 may itself be a compound lens arrangement rather than a single lens.

The diameter of an image spot is determined by the working depth-of-focus (i.e., the maximum tolerable variation in distance between the beam output and plate 55) and the degree to which the radiation beam is concentrated (demagnified) by condensing lens 574. The depth-of-focus, in turn, depends on the NA of the beam actually reaching plate 55. Accordingly, it may prove desirable to increase depth-of-focus by further lowering the NA even of collimated radiation before it strikes plate 55. This can be accomplished by restricting the passage of the beam to a minimal radial extent from the central propagated ray. By so limiting the numerical aperture of the transmitted radiation, one obtains a greater depth-of-focus, although at the cost of lost power from the blocked radiation. In practice, the minimum necessary depth-of-focus is based on mechanical adjustment and accuracy limitations; with this quantity effectively fixed, the optimal aperture diameter is determined primarily by the relationship between the NA value of the radiation emerging from lens 574 and the desired NA value of radiation reaching plate 55. With reference to FIG. 10, this latter value is given by NA=sin(ϕ/2). To implement this aspect of the invention, an annular wall 576 having a selected-size orifice 578 of diameter d therethrough is interposed between lenses 572 and 574.

The proper aperture diameter d is given by d=2(EFL)(sin (ϕ/2)), where EFL is the effective focal length of lens 574 and sin(ϕ/2) represents the desired NA. In an exemplary embodiment, the desired NA=0.27 and EFL=11 mm. Accordingly, d=2(0.27)(11)=5.94 mm.

To facilitate proper alignment between the laser 550, mirror 562 and plate cylinder 50, at least one of the diode and the mirror should be subject to locking mechanical adjustment. One suitable configuration for this purpose is illustrated in FIG. 10. The heat-sink portion 554 of laser 550 is rigidly held between a pair of arms 600, 602 defining a mounting bracket. Laser 550 is rotatable within the bracket by means of a threaded pin extending through bracket arm 600, heat-sink portion 554 and bracket arm 602. A locking nut 604 is used to tighten bracket arms 600, 602 against laser 550. Bracket arms 600, 602 are themselves affixed to a cylindrical table 606, which can rotate within a compression sleeve 608 until the latter is compressed, thereby locking table 606 in a selected angular orientation. This arrangment facilitates biaxial adjustment of the position of laser 550.

Alternatively or in addition, mirror 562 can be mounted to a similar mechanism (as shown in phantom) to facilitate analogous locking movement. Numerous alternate adjustment mechanisms are, of course, possible, the key elements being sufficient degrees of freedom and the ability to firmly secure a fixed alignment that will withstand the vibrations of commercial printing.

Figure 5:
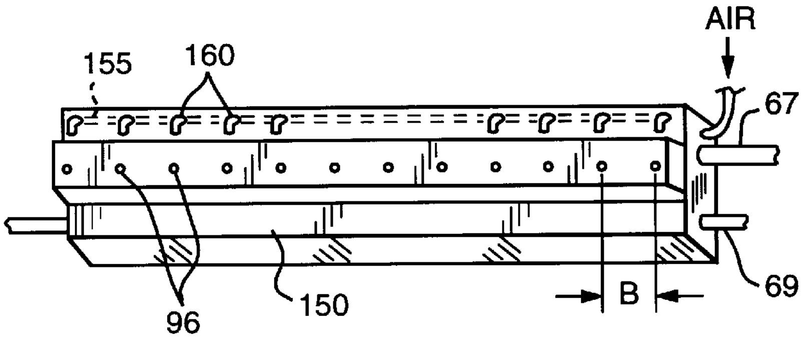
FIG. 5 is an isometric view of the front of a writing array for imaging in accordance with the present invention, and in which imaging elements are arranged in a linear array.
Figure 6:
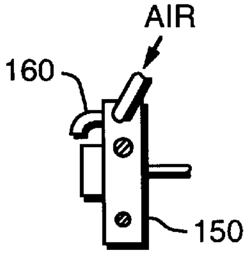
FIG. 6 is a side view of the writing array depicted in FIG. 5.
Figure 11:
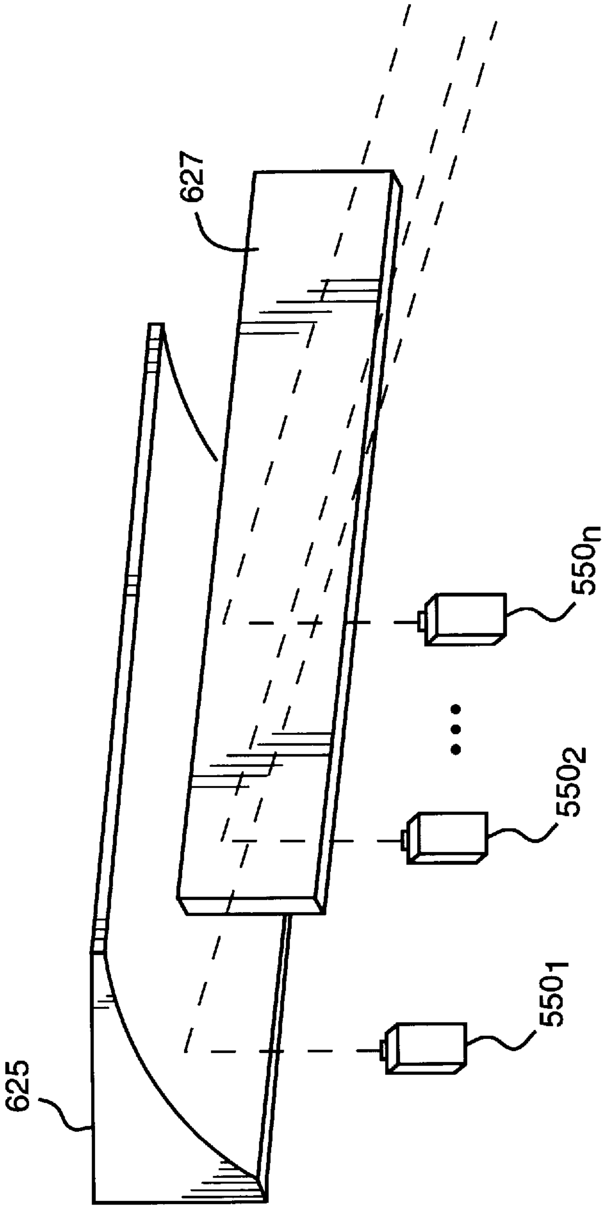
FIG. 11 is an isometric view of an embodiment of the present invention in which a single mirror and lens arrangement accommodates a plurality of laser diodes.

In one implementation, each laser 550 is matched to an independent mirror 562 and lens assembly 570, all affixed to a writing head (e.g., a rectangular bar as shown in FIG. 5). However, it is also possible, as shown in FIG. 11, to utilize a series of lasers $550_1$, $550_2$ . . . $550_n$ (each independently adjustable as to orientation, as discussed above) with a single elongated mirror 625. In this case, the collimating and condensing lenses are similarly elongated, and the orifices 578 distributed along a single bar. (For clarity of presentation, only an elongated collimating lens 627 is shown in the drawing.) In a variation of this implementation, clustering the lasers more closely (e.g., in the staggered configuration shown in FIG. 3) facilitates use of smaller (e.g., round) lenses 572, 574.

Figure 12:
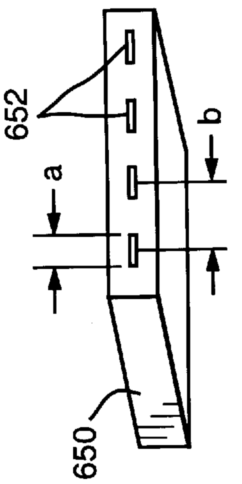
FIG. 12 is an elevational view of a multi-slit laser diode suitable for use in conjunction with the present invention.

In another implementation, a single laser diode having multiple emission apertures, each independently addressable by controller 80, is utilized. As shown in FIG. 12, the diode 650 effectively represents an independent writing head and comprises a plurality of emission slits 652. Each slit has a width a and is spaced a distance b from the next slit. This implementation is utilized in conjunction with an elongated mirror, as shown in FIG. 11, and facilitates the use of a single adjustment mechanism for a plurality of lasers.

Any of the foregoing arrangements can be utilized to obtain multiple resolutions by varying the demagnification ratio (in order to alter the feature size) and the spacing between imaging passes. For example, in the embodiment illustrated in FIG. 12, suppose that distance a=75 $\mu$m, distance b=300 $\mu$m and the demagnification ratio is 1:3. The resulting spots or dots on plate 55 would be 25 $\mu$m in size and their centers spaced apart by 100 $\mu$m. To obtain a resolution of 40 dots/mm, for example, the dots are spaced 25 $\mu$m apart and the axial index distance set at 4×100=400 $\mu$m, so that after 4 imaging passes, diode array 650 is advanced 325 $\mu$m such that the first slit overlies the next axial imaging location, which lies 325 $\mu$m beyond the closest prior imaging pass. To increase the resolution to 50 dots/mm, the spacing between dots is reduced to 20 $\mu$m, and diode 650 is indexed after 5 passes; to increase the resolution still further to 80 dots/mm, the spacing between dots is reduced to 12.5 $\mu$m, and diode 650 is indexed after 8 passes.

Figure 13:
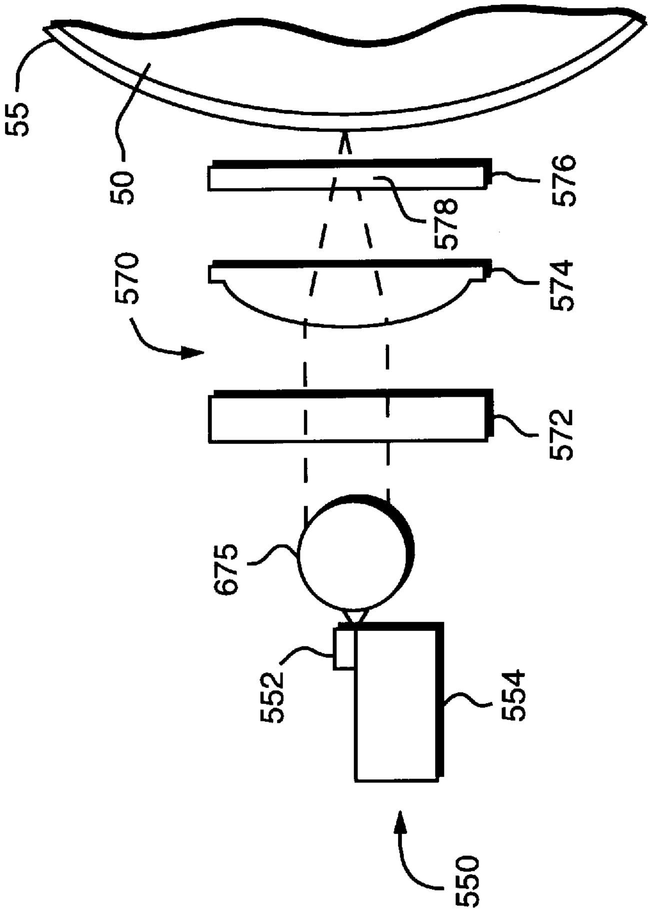
FIG. 13 is a side elevational view, partially in schematic form, of an alternative apparatus for guiding and focusing laser output in accordance with the present invention.

An alternative implementation utilizes a an appropriately contoured microlens to reduce divergence of the beam emitted by a laser diode. Refer to FIG. 13, which illustrates this approach using an elongated, rodlike microlens 675 oriented transversely to the beam emanating from laser laser 550. Microlens 675 reduces the divergence of the emitted radiation, which thereafter passes through a lens assembly 570 as hereinabove described. Preferably, microlens 675 is spaced slightly away from the emission slit of laser 550 as shown in the drawing and has a diameter ranging from just larger than the emission slit to approximately 10–100 times larger than the slit, depending on the degree of divergence reduction required. This arrangement is also suitable for use with multi-slit diode lasers, which are accommodated by a microlens 675 of sufficient length to extend across the emission path of the laser beams.

Preferably, microlens 675 has an antireflection coating to prevent radiation from rebounding and interfering with operation of laser 550 (for example, by causing the condition known as optical noise feedback or "mode hopping"). A practical manufacturing approach utilizes a facet coater to place an antireflection coating on the glass rod intended to serve as a cylindrical divergence-reduction lens. The coating, preferably a multilayer broad-band coating such as magnesium fluoride over titanium dioxide, is applied first along one half of the circumference and then along the other half.

e. Driver Circuitry

Figure 14:
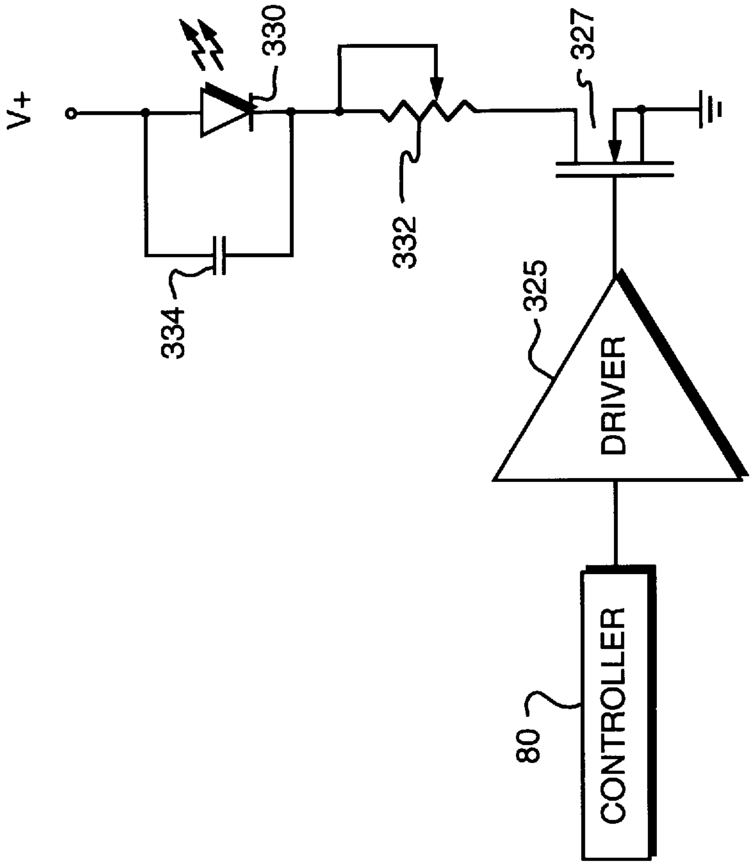
FIG. 14 is a schematic circuit diagram of a laser-driver circuit suitable for use with the present invention.

A suitable circuit for driving a diode-type (e.g., gallium arsenide) laser is illustrated schematically in FIG. 14. Operation of the circuit is governed by controller 80, which generates a fixed-pulse-width signal (preferably 5 to 20 $\mu$sec in duration) to a high-speed, high-current MOSFET driver 325. The output terminal of driver 325 is connected to the gate of a MOSFET 327. Because driver 325 is capable of supplying a high output current to quickly charge the MOSFET gate capacitance, the turn-on and turn-off times for MOSFET 327 are very short (preferably within 0.5 $\mu$sec) in spite of the capacitive load. The source terminal of MOSFET 327 is connected to ground potential.

When MOSFET 327 is placed in a conducting state, current flows through and thereby activates a laser diode 330. A variable current-limiting resistor 332 is interposed between MOSFET 327 and laser diode 330 to allow adjustment of diode output. Such adjustment is useful, for example, to correct for different diode efficiencies and produce identical outputs in all lasers in the system, or to vary laser output as a means of controlling image size.

A capacitor 334 is placed across the terminals of laser diode 330 to prevent damaging current overshoots, e.g., as a result of wire inductance combined with low laser-diode inter-electrode capacitance.

It will therefore be seen that we have developed an advantageous approach to aligning, guiding and focusing laser radiation directly from a laser source to a laser-imageable printing member. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, advantageous use of the divergence-reduction systems disclosed herein is not limited to slit-type emission apertures. Such lenses can be usefully applied to any asymmetrical emission aperture in order to ensure even dispersion around its perimeter.

What is claimed is:

1. Printing apparatus comprising:

a. means for supporting a laser-imageable printing member;

b. at least one laser source capable of producing an imaging output through an elongated emission aperture, the imaging output dispersing along at least one dimension;

c. means for conveying the output of the at least one laser source directly to the printing member, said means comprising a parabolic mirror oriented with respect to the laser so as to reflect the laser output toward the printing member and reduce its dispersion;

d. means for causing relative movement between the at least one laser source and the printing-member-support means: and e. a mask having an annular orifice, disposed between the mirror and the printing-member-support means, to prevent passage of laser output having a numerical aperture greater than a threshold limit.

2. The apparatus of claim 1 further comprising a collimating lens disposed between the mirror and the printing-member-support means.

3. The apparatus of claim 1 further comprising a focusing assembly, disposed between the mirror and the printing-member-support means, to focus the laser output to a preselected spot size on the printing member.

4. The apparatus of claim 1 wherein the limit is 0.3.

5. The apparatus of claim 1 wherein the limit is 0.2.

6. The apparatus of claim 1 comprising a plurality of laser sources and a single mirror.

7. The apparatus of claim 1 comprising a plurality of laser sources and a plurality of mirrors.

8. The apparatus of claim 1 further comprising means for securably adjusting the orientation of the laser with respect to the mirror.

9. The apparatus of claim 1 further comprising means for securably adjusting the orientation of the mirror with respect to the laser.

10. Printing apparatus comprising:

a. means for supporting a laser-imageable printing member;

b. at least one laser source oriented toward the printing member and capable of producing an imaging output through an elongated emission aperture, the imaging output dispersing along at least one dimension;

c. means for conveying the output of the at least one laser source directly to the printing member, said means comprising a cylindrical microlens oriented transversely with respect to the emission aperture so as to reduce the dispersion of imaging output;

d. means for causing relative movement between the at least one laser source and the printing-member-support means; and e. a mask having an annular orifice, disposed between the microlens and the printing-member-support means, to prevent passage of laser output having a numerical aperture greater than a threshold limit.

11. The apparatus of claim 10 further comprising a collimating lens disposed between the microlens and the printing-member-support means.

12. The apparatus of claim 10 further comprising a focusing assembly, disposed between the microlens and the printing-member-support means, to focus the laser output to a preselected spot size on the printing member.

13. The apparatus of claim 10 wherein the limit is 0.3.

14. The apparatus of claim 10 wherein the limit is 0.2.

15. The apparatus of claim 10 comprising a plurality of laser sources and a single microlens.

16. The apparatus of claim 10 further comprising means for securably adjusting the orientation of the laser with respect to the microlens.

17. Printing apparatus comprising:

a. means for supporting a laser-imageable printing member;

b. at least one laser source capable of producing an imaging output through an elongated emission aperture, the imaging output dispersing along at least one dimension;

c. means for conveying the output of the at least one laser source directly to the printing member and reducing its dispersion;

d. a collimating lens disposed between the mirror and the printing-member-support means;

e. a focusing assembly, disposed between the collimating lens and the printing-member-support means, to focus the laser output to a preselected spot size on the printing member;

f. a mask having an annular orifice, disposed between the focusing assembly and the printing-member-support means, to prevent passage of laser output having a numerical aperture greater than a threshold limit; and g. means for causing relative movement between the at least one laser source and the printing-member-support means.

18. The apparatus of claim 17 wherein said means for conveying the output of the at least one laser source directly to the printing member and reducing its dispersion comprises a parabolic mirror oriented with respect to the laser so as to reflect the laser output toward the printing member.

19. The apparatus of claim 17 wherein said means for conveying the output of the at least one laser source directly to the printing member and reducing its dispersion comprises a cylindrical microlens oriented transversely with respect to the emission aperture.

* * * * *